United States Patent Office 3,397,793
Patented Aug. 20, 1968

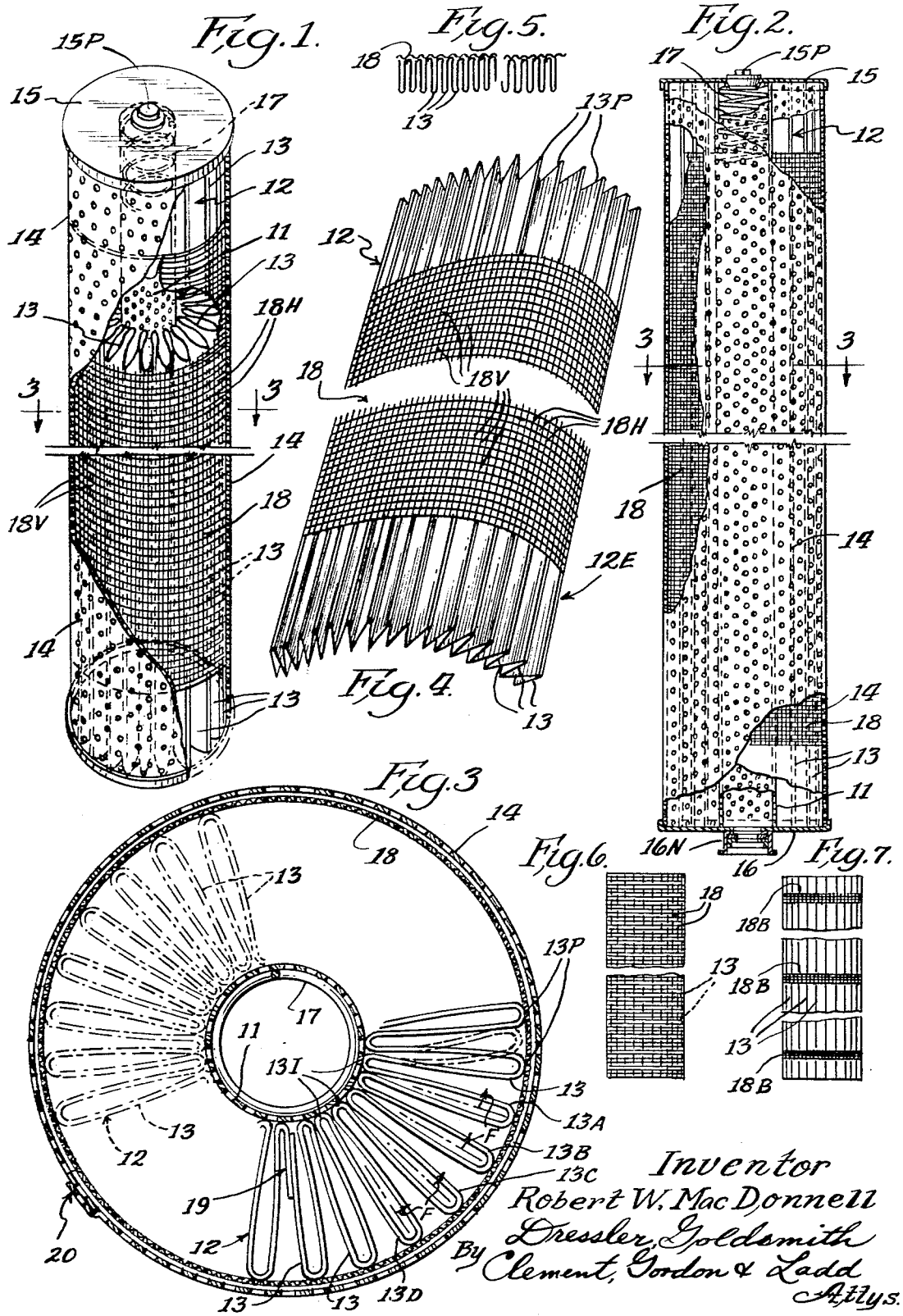

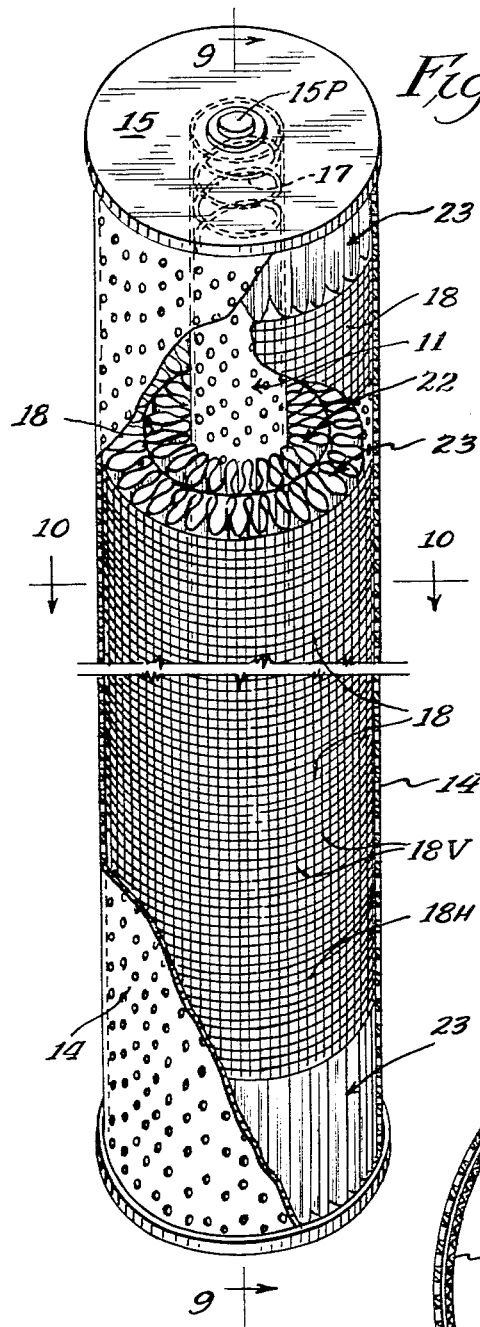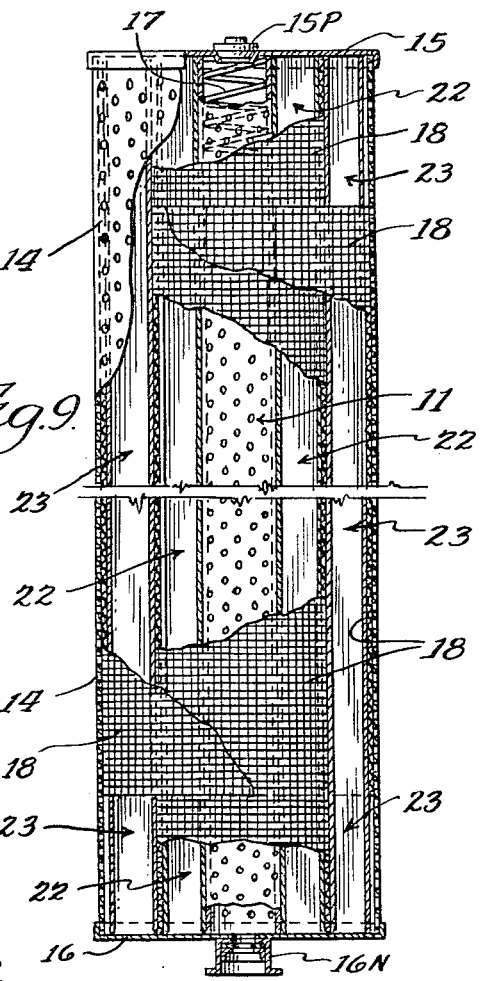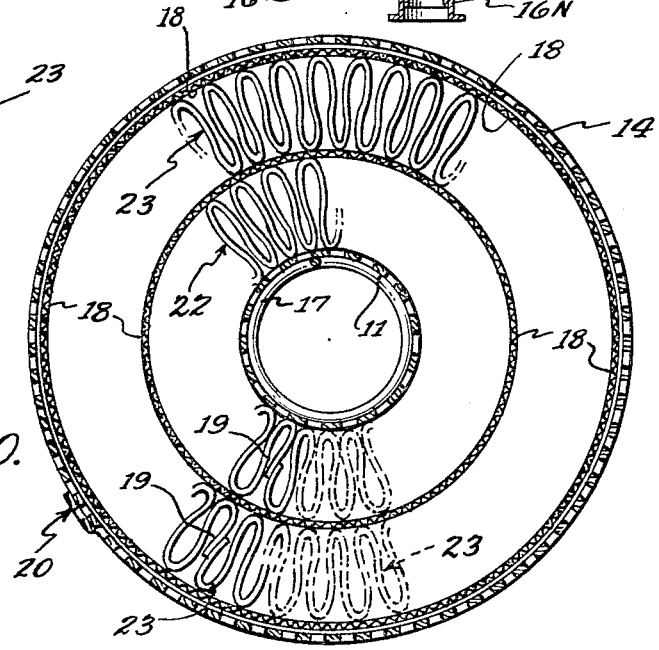

3,397,793
PLEATED FILTER
Robert W. MacDonnell, Crete, Ill., assignor to Allied Filter Engineering, Inc., a corporation of Illinois
Filed Apr. 15, 1965, Ser. No. 448,427
14 Claims. (Cl. 210—457)

ABSTRACT OF THE DISCLOSURE

A resin impregnated pleated paper filter element having an annular array of normally stable, generally radial pleats each being resiliently flexible in a circumferential direction, a netting of cotton fiber circumferentially encircling the pleats in substantially extended relation, and adhesive securing the netting to the pleats to connect the pleats in selectively collapsible ganged relationship to enable any particular pleat to collapse and to provide concurrent circumferential flexing of a plurality of successively adjacent ganged pleats whereby these successively adjacent ganged pleats resiliently return to normal position to restore the collapsed pleat.

---

This invention relates to filters and more particularly to filters of the pleated paper type.

One important application for pleated paper type filters exists in the high pressure lubrication systems of locomotives. The locomotive applications exhibit very difficult operating conditions including high system pressures and flows, cold oil surges at startup, high normal running temperatures, wide variations in contaminant particle sizes and a tendency for filtered contaminants progressively to build up deposits leading to blocking of the pleat pore and final loss of permeability.

Filters for such applications should exhibit a maximum of flow through capacity per unit volume; should maintain a maximum exposed effective filter area; should prevent permanent pleat collapse; and should be effective to filter a wide range of particle sizes including particularly sizes as small as 5 microns.

One of the most prominent problems with pleated filter elements of paper or similar material arises from the inherent resilient flexibility that characterizes each of the individual pleats. The result is that each pleat is subject to individual collapse when subjected to substantial pressure variations to become caked against the adjacent pleat, thus blocking off the caked surfaces against the desired flow of oil. Moreover, the surface deposits of filtered contaminants normally tending to collect on the pleats can cause the pleats to stick together permanently.

While it is possible to solve the pleat collapse problem by permanently securing the pleats in a predetermined stabilized spatial relationship, this solution usually involves sacrificing significant portions of the available filtering surface area. The required mechanical connections to each pleat are difficult to accomplish and are subjected to highly concentrated loading capable of leading to localized rupture.

The filter construction of the present invention utilizes a new approach in that it allows controlled pleat collapse by connecting the pleats in a mechanically ganged relationship wherein flexing collapse of a single pleat causes concurrent flexing of a number of successively adjacent pleats. Each of these adjacent pleats resiliently tends to restore and the mechanically ganged relationship causes collective restoring action of these adjacent pleats to effect return of the collapsed pleat. One important advantage is that the arrangement encourages frequent flexing action of the various pleats. Such flexing tends to break up surface deposits collecting on the pleats, thus maintaining the effective filtering area for an extended period of time.

Another important advantage of the invention is that the construction lends itself to multiple section filters where the individual filter sections may be selected to be of different pore sizing.

In a preferred embodiment wherein a paper filter element having an annular array of pleats is employed, flexible netting encircles the filter element in multiple point securement to each of the ganged pleats. The netting is easily bonded in permanently stable relation to each of the pleats in that it may assume a normally relaxed position upon the pleats, it is not closely dependent upon exactness of pleat heights, and it may easily be selected from materials adapted to securement by adhesive.

Further desirable features for the netting are high strength, dimensional stability in the presence of heat and adhesive compositions, an open mesh structure to allow completely free oil inflow, and a fibrous strand texture capable of itself performing a filtering function on the smaller size particles. An open mesh netting of woven cotton fibers exhibits these features.

Other features and advantages of the invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of the specification, and in which like numerals are employed to designate like parts throughout the same, FIG. 1 is a perspective view of a completed single section filter of a type used in the engine lubrication system of a locomotive, with various portions of the filter broken out and sectioned to facilitate disclosure;

FIG. 2 is a side elevational view of the completed filter, again with portions broken out and sectioned to facilitate disclosure;

FIG. 3 is an enlarged transverse sectional view taken as indicated by the lines 3—3 shown in each of FIGS. 1 and 2;

FIG. 4 is a fragmentary perspective view illustrating an artificial pleat spacing technique utilized during manufacture to enable application of the netting to the pleats with proper predetermined peak to peak pleat spacing corresponding to the natural spacing assumed by the pleats when disposed in an annular array in the completed filter;

FIG. 5 is a fragmentary end elevational view illustrating a further manufacturing procedure wherein the pleated filter element and the netting are compressed in statcked relation to restore all of the pleats to their natural size and shape prior to rolling into an annular array;

FIG. 6 is a fragmentary side elevational view of an alternative form of filter element utilizing a full length netting;

FIG. 7 is a fragmentary side elevational view of another form wherein a series of bands of tension transmitting material are applied at axially spaced regions along the pleats to effect a mechanically ganged relationship;

FIG. 8 is a perspective view of a completed multiple section filter employing circumferentially tiered filter sections with portions of the completed filter broken away and sectioned to facilitate disclosure;

FIG. 9 is partly a vertical sectional view through the multiple section filter of FIG. 8, with selected portions of the structure shown in elevation; and FIG. 10 is an enlarged transverse sectional view taken as indicated on the line 10—10 of FIG. 8.

Referring now to the drawings, the invention as disclosed herein is illustrated in connection with cylindrical type filters suited particularly for use in the engine lubrication systems of diesel locomotives. In FIGS. 1 to 3, a single section type of filter is illustrated whereas in FIGS. 8 to 10 a multiple section type of filter is illustrated.

The single section filter of FIGS. 1 to 3, as shown herein for purposes of illustrative disclosure, includes a perforated cylindrical tube 11 serving as a core, an elongated permeable filter section 12 disposed in an annular array closely encircling the core and characterized by a series of circumferentially distributed pleats 13 which extend lengthwise substantially coextensive with the core. The filter section 12 when arrayed annularly presents a radially inner set of peaks 131 and a radially outer set of peaks 13P. An outer cover wrap 14 closely encircles the filter section 12 and may extend the full length thereof to seat in upper and lower end caps 15 and 16, respectively, which are usually bonded in closure relation across opposite ends of the filter section. Each of the end caps also has sealing relationship to the opposite ends of the core 11 to prevent end leakage of unfiltered oil into the core. The upper end cap 15 has a central access plug 15P normally closing the same while the lower end cap 16 is fitted with a central connection nipple 16N completing a discharge outlet passage from the lower end of the core 11.

The core 11 is preferably constructed of light gauge sheet metal and is provided with internal reinforcement in the form of a helical spring 17 extending substantially its entire length and serving to prevent buckling of the core under high system pressures and surges. The metal core construction is resistant to deterioration even in the presence of high temperature oil. While the core 11 is illustrated as a permanent part of the completed filter, this is not a necessary requirement for filter constructions incorporating the principles of the present invention.

The outer cover wrap 14 may be of a perforated paper, paperboard, or thin sheet metal construction when used full length of the filter or may be imperforate when extending only part way of the length of the filter.

In accordance with the present invention, the adjacent pleats 13 are connected in a mechanically ganged relationship so that circumferential flexing of any one pleat involves circumferential flexing of a plurality of successively adjacent pleats. Such a mechanically ganged arrangement is best accomplished by connecting the pleats with a flexible tension transmitting structure. Structures for this purpose are most easily connected to the pleats by securement in overlying multiple point contact to each of the outer peaks of the pleats.

One tension transmitting sructure for ganging the pleats is represented in FIGS. 1 to 5 as comprising a netting 18 of flexible strand material and extending in encircling relaxed relation about the outer peaks 13P of the pleats. It is apparent in the drawings that the netting has multiple point intersecting contact for multiple point securement to each of these outer peaks 13P. The netting 18 is represented as a reticulated network of generally horizontal strands 18H and generally vertical strands 18V. The horizontal strands 18H preferably extend substantially circularly of the pleat circumference for optimum control of circumferential flexure but some angling can be utilized in order to increase the points of intersection between the vertical strands 18V and the outer peaks. In the arrangement illustrated, the netting has a vertical dimension corresponding to about 75% of the length or height of the filter element. For example, for a 30 inch long filter element, the netting may be 22 inches long and centered with respect to the ends of the filter.

In accordance with the present invention, the preferred method of manufacture of the filter section starts with a flat sheet of filter media which is pleated in any desired manner to present a planar array of pleats, each inherently being resiliently flexible. This planar array is cut to proper length. In current practice, it is preferred to utilize a filter media of kraft paper which is first pleated, then impregnated with a resinous material such as a thermosetting phenolic condensation product and cured prior to cutting into proper size pleated paper elements 12E. The final treated filter media typically may have a pore size in the range of from about 10 microns to about 25 microns.

The precut element 12E of the prepleated filter media is then placed in a handling jig that artificially establishes an arcuate formation as pictured in FIG. 4 wherein corresponding outer peaks 13P of the pleats have a peak to peak spacing which is substantially the equivalent of the natural peak to peak spacing assumed by the pleated filter element when rolled from the planar array in which it is formed to an annular array encircling the core 11.

With the outer peaks of the pleats properly spaced as illustrated in FIG. 4, adhesive is appropriately applied along the lengths of the peaks. Preferably strip coatings of thermosetting adhesive are applied by means of a roller or other applicator to the pleat peaks along the regions to be provided with the netting. A netting 18 of precut size is laid over the outer peaks, with the netting being in a snug but relaxed configuration so that the strands of the netting are neither tensioned nor unduly slack. Where thermosetting adhesive is used on the peaks, the handling jig with the netting in place on the pleat peaks, is located beneath a heated plate that contacts the netting and pleat peaks with slight pressure, only sufficient to assure total bonding of the netting to the peaks.

While the filter media as originally pleated preferably may have the pleats which are to be secured to the netting of corresponding height the conformability of the flexible netting and the action of the handling jig in which the peaks are artificially spaced avoid any difficulties that might arise where the pleats are of somewhat different height. Moreover, it should be noted that where the netting is inelastic, which is preferred, the exactness of the artificial spacing is important for insuring that the completed filter section 12 may be rolled into an annular array characterized by substantially uniform peak to peak spacing about its entire circumference.

The assembly of the pleated paper filter element 12E and the netting 18 is not further processed until complete curing of the adhesive bond therebetween is assured. It is important that the application of the outer cover wrap 14 be accomplished without impairing freedom of flexural movement of the pleats and this is insured by allowing the adhesive on the pleats to cure completely before the wrap is applied.

In any event, after complete curing of the adhesive coating on the pleats the filter section assembly 12 comprised of the pleated paper filter element 12E and the netting 18 is lightly compressed into the stacked configuration illustrated in FIG. 5. This restores the pleats 13 to the natural configuration in which they are originally formed even in the event that this configuration were in any way distorted in connection with its insertion and processing in the handling jig. Thus it should be noted that the configuration of the pleats as illustrated in FIG. 3 is essentially the natural configuration assumed by the originally pleated filter media if it were to be rolled into an annular array.

In particular, this natural unstressed configuration is characterized by a slight bowing of the walls of each pleat and by the pronounced tendency for each pleat to undergo inherent resilient flexing movement about lengthwise lines. The natural bowing effect is desirable for enabling each pleat to maintain effective filtering surface areas, thus intraface contact of the walls of each pleat is undesirable.

After the filter section is arrayed about the core, its opposite edges are overlapped as indicated at 19 in FIG. 3 and secured by staples or other suitable edge fastening means (not shown) to stabilize the configuration. The outer cover wrap 14 is then applied by wrapping a sheet about the unit, overlapping its opposite edges as indicated at 20 in FIG. 3 and securing the same in a side seam sealer. The outer cover wrap 14 encircles the pleats without interfering with the desired free flexure thereof.

The inherent resilient flexing action of each pleat is illustrated in phantom lines in the case of one of the pleats shown in FIG. 3. It will be appreciated that the relaxed but substantially slack free mounting configuration of the netting would cause a series of sucessively adjacent pleats, designated 13A, 13B, 13C and 13D in FIG. 3, to undergo corresponding circumferential flexing movement. This follower movement is not illustrated in the drawings except by showing pleat center lines in phantom and indicating by arrows F of proportional length the amount of flexure of each center line. It may be noted that the more remote a pleat is from the particular collapsing pleat, the less its flexure travel. This results from the cumulative effect of the slight slack action which normally exists in the circumferential strands 18H of the netting.

In the past, the problem has been in the case of pleated filter constructions that collapse of individual pleats by circumferentially flexing movement to a position where it contacts and blocks the filter surface of the next adjacent pleat leads to serious loss in the filter capacity. Previous approaches have been directed at stabilizing the position of the pleats whereas in the present arrangement, the tendency to flex is freely permitted and is utilized to achieve improved filter performance. Normally a pleat collapse will occur due to a cold oil surge on engine start-up or due to a sharp variation in system operating pressures. Each of these are momentary conditions and the problem to solve has not been that of momentary pleat collapse. In the past, the collected deposits on the pleat faces cause a collapsed pleat to stick or cake on the next adjacent pleat so that the collapse becomes permanent.

The mechanically ganged action of the pleats in the present filter enables the successively adjacent pleats 13A, B, C and D to undergo individual follower flexing movement to store energy which is then collectively applied through the netting 18 to effect positive return movement of the collapsed pleat in spite of any tendency to stick. Moreover, each time a pleat flexes, any deposit building up on that pleat tends to fracture and drop off so that the flexing action continually tends to maintain the filer surfaces at their desired original permeability. Such deposits are forced to the lower end of the filter by the pattern of flow of the oil entering the filter through its outer cover wrap 14. The oil flow pattern has a natural vertical component due to the mounting arrangement of the filter and due to the location of its discharge outlet 16N.

Other advantages directly resulting from the use of netting as the means for mechanically ganging the pleats include the feature that the netting may have a large sized open mesh configuration to insure full flow action through the filter. The netting material may be selected to achieved superior bond relationship between the netting and the pleats, thereby enabling a filter that is otherwise largely conventional to be used in a system wherein the by-pass pressure valve opening is set at 125 p.s.i. rather than at 60 p.s.i. which has been the past practice. This increased by-pass valve setting means in the case of engine lubrication systems for locomotives that all of the lubrication oil can be passed through the filter so that the engine need never be exposed to unfiltered oil.

In the preferred practice of the invention, the netting 18 is preferably of a woven cotton fiber material. Desirably, this is inelastic, inexpensive, easy to bond to the pleated paper filter element, and capable of itself serving as a filtering media in the case of the more minuscule particles of contaminant. That is, particles of less than the pore size selected for the paper filter element itself. Thus in the case of an open mesh cotton netting, a maximum flow of oil is accomplished through the mesh openings and at the same time the fibrous texture of the cotton strands catch and trap the small particles carried in the oil passing through the strands.

A standard diesel lube oil filter is 6½ inches long in diameter and may have about 60 pleats.

In FIG. 6, an alternate fiber section construction is illustrated wherein the netting 18 extends to the extreme ends of the pleats 13 in which case a central region of the filter may omit netting entirely. In some instances, however, the application requirements for the filter may involve such high system pressures and surges that it would be desirable to apply a single piece of netting full length end to end of the pleats and FIG. 6 may be understood as illustrating such an arrangement.

Another alternative arrangement is illustrated in FIG. 7 wherein the pleats 13 are shown equipped with axially spaced bands 18B which again may be of netting material though this is not necessary. Any material may be used for these bands which is capable of positive securement to the pleats for transmitting tension therebetween to effect a mechanically ganged relationship. The free length regions of the pleats 13 are dependent upon the inherent antibuckling strength of each individual pleat and on the system pressures involved. Therefore, the construction of FIG. 7 may be used with conventional pleated paper filter elements where system pressures permit or may be used even in higher pressure systems where the pleats are reinforced against buckling or otherwise are of an antibuckling structural material.

The filter construction of this invention finds important application in the case of multiple section filters, such as is illustrated in FIGS. 8 to 10. This filter has a core 11, an inner filter section 22 encircling the core and an outer filter section 23 encircling the inner filter section in a circumferentially tiered relationship. Finally, an outer cover wrap 14 of suitably perforated sheet material having its opposite ends overlapped and bonded is shown applied about the filter section 23. In the disclosure, each of the filter sections 22 and 23 is of the same basic type illustrated in FIGS. 1 to 5. The inherently full flow characteristic of the filter section construction of this invention makes it particularly suited to a circumferentially tiered multiple section arrangement. Such arrangements offer important advantages primarily in that the geometry is such that the amount of effective filter area for a given diameter cylindrical filter may be as great as 25% more in the case of a two-section filter as compared with a one-section filter. Another advantage is that the inner section may be selected to have a smaller pore size than the outer filter section. For example, the inner filter section 22 may have a 10 micron pore structure and the outer filter section 23 may have a 20 to 25 micron pore structure.

Thus, while preferred constructional features of the invention are embodied in the structure illustrated herein, it is to be understood that changes and varitions may be made by those skilled in the art without departing from the spirit and scope of the appended claims.

What is claimed is:

1. In a filter, an elongated permeable filter element providing a lengthwise extending annular array of normally stable pleats, each being resiliently flexible in a direction generally circumferential of the filter element, and flexibly collapsible foraminous means successively extending from pleat to pleat and being secured to each pleat and interconnecting the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent ganged pleats thereafter resiliently restoring to act collectively through said flexible means in returning the collapsed pleat.

2. In a filter, an elongated permeable filter element providing a lengthwise extending annular array of normally stable pleats, each being resiliently flexible in a direction generally circumferential of the filter element, and flexibly collapsible means successively extending from pleat to pleat and being secured to each pleat and interconnecting the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent ganged pleats thereafter resiliently restoring to act collectively through said flexible means in returning the collapsed pleat, said means including tension transmitting flexible netting circumferentially encircling said filter element in widely distributed, multiple point fixedly intersecting contact with outer extremities of the ganged pleats.

3. In a filter, an elongated permeable filter element providing a lengthwise extending annular array of normally stable circumferentially distributed pleats, each being resiliently flexible in a generally circumferential direction about said filter element, and tension transmitting flexibly collapsible foraminous means secured to each pleat and extending circumferentially of the filter element and interconnecting the circumferentially distributed individual pleats thereof in a selectively collapsible ganged relationship to enable circumferential collapse of any particular ganged pleat towards an adjacent ganged pleat and to provide concurrent circumferential flexing movement of a plurality of successively adjacent ganged pleats when said particular one thereof undergoes circumferential collapse to enable said successively adjacent ones, in subsequently restoring, to return the collapsed one.

4. In a filter, an elongated permeable filter element providing a lengthwise extending annular array of normally stable pleats, each being resiliently flexible in a direction generally circumferential of the filter element, tension transmitting flexibly collapsible netting circumferentially encircling said filter element in widely distributed, multiple point, intersecting contact with outer extremities of said pleats, and securing means fixing said netting to the outer extremities of the pleats to connect the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent pleats thereafter resiliently restoring to act collectively through said netting in returning the collapsed pleat.

5. In a filter, an elongated permeable paper filter element providing a lengthwise extending annular array of normally stable pleats, each being resiliently flexible in a direction generally circumferential of the filter element, flexibly collapsible netting of woven cotton fiber material circumferentially encircling said filter element in widely distributed, multiple point, intersection contact with outer extremities of said pleats, said netting spanning a major fraction of the length of said filter element, and adhesive securing means fixing said netting to the outer extremities of the pleats to establish the netting in tension transmitting relation between adjacent pleats and thereby connect the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent pleats thereafter resiliently restoring to act collectively through said netting in returning the collapsed pleat.

6. In a filter, a perforate cylindrical core providing a discharge outlet at one lengthwise end, an elongated permeable paper filter element providing a lengthwise extending annular array of normally stable pleats encircling the core and radiating therefrom, each pleat being resiliently flexible in a direction generally circumferential of the filter element, tension transmitting flexibly collapsible netting circumferentially encircling said filter element in widely distributed, multiple point, intersecting contact with outer extremities of said pleats, said netting spanning a major fraction of the length of said filter element, adhesive securing means fixing said netting to the outer extremities of the pleats to connect the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent pleats thereafter resiliently restoring to act collectively through said netting in returning the collapsed pleat, and an outer cover wrap encircling the filter element in mechanically free relation to both the pleats and the netting and accommodating inflow of liquid towards said pleats.

7. In a filter, an elongated permeable filter element providing a normally stable lengthwise extending annular array of integrally connected pleats presenting a series of radially outermost pleat peaks and a series of radially innermost pleat peaks, each pleat that presents a radially outermost pleat peak being individually resiliently flexible along lengthwise bend lines through such pleat, tension transmitting flexibly collapsible netting circumferentially encircling said filter element in widely distributed, multiple point, intersecting contact with said outer pleat peaks, and securing means fixing said netting to each outer pleat peak at a plurality of points to gang the pleats circumferentially and enable selective circumferential collapse of any ganged pleat to flex a plurality of successively adjacent ganged pleats, with the adjacent pleats subsequently restoring to return the collapsed pleat.

8. In a filter, an elongated permeable filter element providing a normally stable lengthwise extending annular array of integrally connected pleats presenting a series of radially outermost pleat peaks and a series of radially innermost pleat peaks, each pleat that presents a radially outermost pleat peak being individually resiliently flexible along lengthwise bend lines through such pleat, tension transmitting flexibly collapsible netting circumferentially encircling said filter element in widely distributed, multiple point, intersecting contact with said outer pleat peaks, and means for securing said netting to each outer pleat peak at a plurality of points to gang the pleats circumferentially and enable selective circumferential collapse of any ganged pleat to flex a plurality of successively adjacent ganged pleats, with the adjacent pleats subsequently restoring to return the collapsed pleat.

9. In a filter, a plurality of circumferentially arranged generally lengthwise coextensive filter sections, each filter section comprising an elongated permeable filter element providing a lengthwise extending annular array of normally stable pleats, each being resiliently flexible in a direction generally circumferential of the filter element, and means secured to each pleat and connecting the pleats in a ganged relationship to provide concurrent circumferential flexing movement of a plurality of successively adjacent ganged pleats when any particular ganged pleat undergoes circumferential collapse, with each of said plurality of successively adjacent pleats thereafter resiliently restoring to act collectively through said means in returning the collapsed pleat, and the pleats and ganging means of each filter section being mechanically free of any adjacent filter section.

10. In a filter, a plurality of circumferentially arranged generally lengthwise coextensive filter sections, each filter section comprising an elongated permeable filter element providing a lengthwise extending annular array of normally stable pleats, each being resiliently flexible in a direction generally circumferential of the filter element, tension transmitting flexible netting circumferentially encircling said filter element in widely distributed, multiple point, intersecting contact with outer extremities of said pleats, and securing means fixing said netting to the outer extremities of the pleats to connect the pleats in a ganged relationship providing concurrent circumferential flexing movement of a plurality of successively adjacent ganged pleats when any particular ganged pleat undergoes circumferential collapse, with each of said plurality of successively adjacent pleats thereafter resiliently restoring to act collectively through said netting in returning the collapsed pleat, and the pleats, netting and securing means of each filter section being mechanically free of any adjacent filter section.

11. In a filter, a perforate cylindrical core providing a discharge outlet at one lengthwise end, a plurality of circumferentially arranged generally lengthwise coextensive filter sections encircling the core, each filter section comprising an elongated permeable paper filter element providing a lengthwise extending annular array of normally stable pleats, each being resiliently flexible in a direction generally circumferential of the filter element, flexible netting of woven cotton fiber material circumferentially encircling said filter element in widely distributed, multiple point, intersecting contact with outer extremities of said pleats, said netting spanning a major fraction of the length of said filter element, and adhesive securing means fixing said netting to the outer extremities of the pleats to establish the netting in tension transmitting relation between adjacent pleats and thereby connect the pleats in a ganged relationship providing concurrent circumferential flexing movement of a plurality of successively adjacent ganged pleats when any particular ganged pleats undergoes circumferential collapse, with each of said plurality of successively adjacent pleats thereafter resiliently restoring to act collectively through said netting in returning the collapsed pleat, with the pleats, netting and securing means of each filter section being mechanically free of any adjacent filter section, and an outer cover wrap encircling the outermost filter element in mechanically free relation to the pleats, netting and securing means thereof and accommodating inflow of liquid towards the pleats thereof.

12. In a filter, an elongated permeable filter element providing a lengthwise extending array of generally side by side spaced normally stable pleats, each pleat being resiliently flexible in a direction generally transverse of the filter element, and flexibly collapsible foraminous means secured to each pleat and connecting the pleats in an individually ganged relationship to enable flexing collapse of any particular ganged pleat towards an adjacent ganged pleat and to provide concurrent flexing movement of a plurality of successively adjacent ganged pleats where said particular ganged pleat undergoes flexing collapse, with each of said plurality of successively adjacent pleats thereafter resiliently restoring to act collectively through said means in returning said particular pleat.

13. In a method of making filters, the improvement comprising pleating a flat sheet of resinous impregnated filter material into a filter element having a generally planar array of side by side spaced pleats, disposing said pleated flat sheet in a configuration for artificially spacing said pleats to establish said side by side pleat peaks in a uniform predetermined spaced relationship, bonding a layer of flexibly collapsible netting to corresponding artificially spaced peaks of said pleats, and rolling the array and securing it into an annular configuration wherein the pleats are generally radial and the netting is outermost and holds the pleats connected in selectively collapsible ganged relationship and wherein the spacing of said pleat peaks remains substantially identical to said predetermined spaced relationship to hold said netting substantially fully extended.

14. In a method of making filters, the improvement comprising pleating a flat sheet of resinous impregnated filter material into a filter element having a generally planar array of side by side spaced pleats presenting corresponding pleat peaks, disposing said pleated flat sheet in a configuration for artificially spacing said pleats to establish said corresponding pleat peaks in a uniform predetermined spaced relationship, coating pleat peaks with adhesive, applying a substantially fully extended layer of flexible netting to said corresponding pleat peaks while the same are maintained in said predetermined spaced relationship and at a time prior to curing of the coating of adhesive, and after curing of the adhesive rolling the array and securing it into an annular configuration wherein the netting is outermost and holds the pleats connected in ganged relationship and wherein the spacing of said pleat peak remains determined by said annular configuration and that is substantially identical to said predetermined spaced relationship to hold said netting substantially fully extended.

References Cited

UNITED STATES PATENTS

| | | | |
|---|---|---|---|
| 2,269,461 | 1/1942 | Lehmberg | 55—521 |
| 2,864,505 | 12/1958 | Kasten. | |
| 2,919,807 | 1/1960 | Briggs | 210—493 X |
| 2,216,578 | 11/1965 | Wright et al. | 210—484 |
| 3,241,680 | 3/1966 | Humbert | 210—493 |
| 2,395,449 | 2/1946 | Briggs | 210—493 X |

FOREIGN PATENTS

| | | |
|---|---|---|
| 823,648 | 11/1959 | Great Britain. |
| 120,084 | 1959 | U.S.S.R. |
| 588,991 | 6/1947 | Great Britain. |

REUBEN FREIDMAN, *Primary Examiner.*

C. DITLOW, *Assistant Examiner.*

Notice of Adverse Decision in Interference

In Interference No. 99,154, involving Patent No. 3,397,793, R. W. MacDonnell, PLEATED FILTER, final judgment adverse to the patentee was rendered Dec. 7, 1976, as to claims 1–5.

[*Official Gazette March 22, 1977.*]